106. COMPOSITIONS, COATING OR PLASTIC.

Patented Feb. 17, 1931

1,792,755

UNITED STATES PATENT OFFICE

HANS M. OLSON, OF FALLBROOK, CALIFORNIA

CHLORINE-TREATED CEMENT

No Drawing.    Application filed January 16, 1929.   Serial No. 333,030.

This invention relates to the treatment of cement, particularly hydraulic cement so as to attain rapid set and early strength.

Calcium chloride and other soluble compounds of calcium chloride base have been employed as admixtures in cement, concrete and the like to accelerate hardening, increase density and effect earlier attainment of strength. However, due to the fact that calcium chloride and compounds of calcium chloride base are deliquescent, incorporation in the cement when dry and before gauging results in undesirable hygroscopic qualities. The term calcium chloride is hereinafter used as inclusive of calcium chloride base compounds. Calcium chlorides have been heretofore used with more or less success by dissolving them in the water in which the cement or concrete is gauged, or in the case of highway construction or other than monolithic work, the chloride has been used as a hygroscopic agent by sprinkling it in a finely pulverized or flaked form on the surface of the green cement or concrete. Both of these methods are open to at least three objections inasmuch as they are, in the first place, expensive, and, in the second place, they involve the expenditure of a considerable amount of labor and time, and, in the third place, they cannot be applied to the best advantage except by a workman possessed of somewhat unusual technical knowledge and skill. Nevertheless, it has hitherto been found impracticable to apply the chloride and mix it with cement at any earlier or more convenient stage of the operations, as for instance, during the ordinary course of the manufacture of the cement, or when in its dry manufactured state, because the natural hygroscopic properties of the chloride would render the dry manufactured cement so susceptible to moisture (atmospheric or otherwise) that it would be impossible to keep it, even for a short time, in bags or in ordinary storage without deterioration, as it would rapidly cake and spoil.

It has been found that there is an optimum percentage of calcium chloride for a given cement and that beyond a critical percentage, further additions produce a reduction in strength as compared to similar cement without admixtures. The correct percentage in view of the conditions which are present when the admixing is performed is difficult to obtain.

It has been the current theory that the calcium ingredients of the accelerator has been the active agent in producing acceleration. However by numerous experiments I have found that the chlorine ingredient is the active agent.

I do not wish to limit myself to any theory, but rely on the facts disclosed by my investigations. These are that solely free chlorine incorporated with hydraulic cements will produce therein accelerating qualities equal to, if not superior to the admixture of calcium chlorides or equivalent compounds thereof, will produce a greater plasticity and greater ultimate strength. Chlorine has no hygroscopic qualities and may be added to the dry cement so that the latter may be stored without deterioration and used as desired.

The objects of this invention are to provide a non-hygroscopic hydraulic cement including chlorine; to provide cement with an accelerating ingredient which may be incorporated therewith by more economical and efficient methods than heretofore; to provide a cement with an accelerator of the character described which is not subject to decrease in strength when a greater percentage of chlorine is added than the critical; to provide an accelerator which increases plasticity and adds to the ultimate strength.

My invention resides primarily in adding solely free chlorine to the cement. In order to effect a thorough combination of the cement and chlorine, whether it be chemical, mechanical or both, the cement particles and chlorine gas are intimately mixed. As applied to the composition of cement and chlorine obtained in accordance with my invention the words "mix" and derivatives thereof are used in their broad sense and not limited to mechanical mixtures.

In carrying out my invention, I prefer to bring about the desired results by mixing chlorine gas with the cement during the last grinding operation to which it is subjected in the process of manufacture. However, an additional grinding operation may be performed after manufacture of the cement has been completed. The grinding and admixture may be accomplished in a tube mill or other suitable grinding device enclosed so that chlorine gas may be added. The cement takes up the optimum percentage of chlorine and retains the latter. Such grinding thoroughly mixes and intermingles the cement and chlorine so that the resultant product has a distinctive chlorine odor for some time.

Fairly good results can be obtained by allowing the cement to absorb free chlorine in a closed chamber or agitator such as is used when lime is treated with chlorine to form the chloride of lime of commerce, but results obtained by this method are not so good as when the chlorine is interground. So small an amount of chlorine is needed that the most effective method I have found is to intergrind it direct with the cement and preferably in a dry state, so that each cement particle is acted upon by a small amount of full strength chlorine.

Hydraulic cement prepared by this process is quite non-hydroscopic and moisture resistant and will keep in ordinary storage for an indefinite time. It will mix well with water and form a mortar. When moistened and gauged, it will be found to harden more rapidly than ordinary hydraulic cement and with greater uniformity of action.

What I claim is:—

1. A process of preparing a cement product comprising directly mixing chlorine gas with hydraulic cement.

2. A process of preparing a cement product comprising intergrinding hydraulic cement and free chlorine.

3. A cement composition comprising hydraulic cement having free chlorine incorporated therein.

4. A hydraulic cement having incorporated therein an accelerator comprising solely chlorine.

5. A hydraulic cement composition consisting of the ingredients, dry cement having free chlorine incorporated therein.

In witness that I claim the foregoing I have hereunto subscribed my name this 11th day of January, 1929.

HANS M. OLSON.